United States Patent Office 2,839,387
Patented June 17, 1958

2,839,387

METHOD FOR THE CYANIDATION OF PRECIOUS METALS

Reginald William Burton, Alice Arm, British Columbia, Canada, assignor to The Mining Corporation of Canada Limited, Toronto, Ontario, Canada, a corporation of Canada No Drawing. Application May 28, 1954
Serial No. 433,303

6 Claims. (Cl. 75—105)

The present invention relates to the cyanidation of precious metals.

Cyanidation has been known in the metallurgical art for more than fifty years. In this process the gold and/or silver is extracted by treating the finely ground ore with a dilute aqueous solution of an alkaline cyanide, for example sodium cyanide which dissolves the gold and silver. The solution carrying the gold and silver (termed the "pregnant" solution) is separated from the insoluble constituents of the ore and the dissolved gold and silver are recovered from the solution by precipitation with zinc dust or by means of any other suitable precipitant.

It has long been recognized that some precious metal ores were more amenable to treatment by cyanidation than others. Ores containing tellurides of gold and silver and silver ores containing antimonial and arsenical compounds of silver have been recognized as being refractory to cyanidation in that the cyanide solution will not attack these minerals as readily as the same cyanide solutions will attack metallic gold and silver under similar conditions.

Various auxiliary reagents have been proposed in the art from time to time for improving the extraction by cyanidation of precious metals from such refractory ore. Generally speaking, these have been oxidizing agents such as manganese dioxide, sodium peroxide and potassium permanganate. In addition, use has been made of substances which liberate cyanogen within the dissolving solution. Another method proposed for increasing the dissolving power of the cyanide solution for gold and silver in refractory ores is the bromo-cyanide process wherein the required proportion of reagents, such as sodium cyanide, sodium bromate, sodium bromide and sodium bisulphate were dissolved in water to provide a solution which in the presence of little or no free alkali is a more potent solvent for some gold and silver minerals than ordinary cyanide solutions. In addition to the above, it has been suggested in certain instances to use thiourea, condensation products of thiourea, wetting agents such as sulphated high molecular alcohols and alkylated aryl sulphonates, and ammonia or ammonium salts to assist the rapid solution of precious metals during cyanidation.

I have now found that aliphatic polyamines selected from the group consisting of diethylene triamine, triethylene tetramine, and tetraethylene pentamine produce the most surprisingly effective result when used in small quantities for assisting the solution of the precious metals in the cyanidation of refractory ores. These polyamines have the following formulae:

Diethylene triamine—$NH_2CH_2CH_2NHCH_2CH_2NH_2$
Triethylene tetramine—$NH_2(CH_2CH_2NH)_2CH_2CH_2NH_2$
Tetraethylene pentamine—
$$NH_2(CH_2CH_2NH)_3CH_2CH_2NH_2$$

In carrying out the process of the present invention, cyanidation is carried out in the usual way using the normal reagents but using in addition thereto a small quantity of up to about two pounds per ton of one of the above-mentioned polyamines. The only particular care which must be taken in order to achieve effective results is that the concentration of calcium hydroxide in the solution must be kept low during the dissolving process. Generally speaking, the dissolving solution should not contain in excess of about 1/10 of a pound of calcium hydroxide per ton of solution. The amount of calcium hydroxide which can be tolerated depends, however, upon the type of ore being treated, and in some instances up to 1/4 of a pound per ton of calcium hydroxide has been present in the dissolving solution without deleterious effects. After solution is complete, however, the addition of an excess of calcium hydroxide does not result in the precipitation of the dissolved precious metals or bring about any other detrimental effect.

The above polyamines may be added to the ore pulp prior to the addition of the cyanide, with the cyanide solution, or subsequent to the addition of the cyanide solution. Generally speaking, however, it has been found most convenient simply to add the polyamine to the usual cyanide solution.

The invention and its operation will be more fully understood with reference to the following detailed description of a cyanidation process carried out according to the invention using triethylene tetramine as the polyamine.

(a) *Preparation of ore for treatment.*—The ore may be ground wet or dry in any recognized ore grinding device such as ball mill, tube mill, rod mill, etc. The grinding unit requires no special lining material. The ground ore may be classified or sized, either wet or dry. As in other hydrometallurgical processes, the ore must be ground to a degree of fineness so that all of the minerals sought will be exposed to the dissolving solution. The equipment used for conveying or containing the product of the grinding operation may be of the same materials as that used in conventional cyanidation plants.

(b) *The dissolving process.*—In most cyanide plants, the dissolving process starts in the grinding circuit. When triethylene tetramine is used as an adjunct to cyanidation, this course may still be followed, with certain reservations.

The ground ore when agitated with water, or with the dissolving solution, must not impart to the liquid a condition of acidity. In other words, a mixture of the ground ore and water must not have a hydrogen ion concentration of less than pH 7. If an ore is treated that shows, under these conditions, an acid reaction, then the acidity must be neutralized by the addition of an alkali until the water or dissolving solution is neutral (pH 7) or slightly alkaline (above pH 7). The foregoing remarks on the neutralizing of acid-forming constituents in the ore have been recognized and applied to cyanidation since its inception. In treating nearly all ores by the accepted procedure of cyanidation, lime (either CaO or $Ca(OH)_2$) is added to either the ore or the dissolving solution to neutralize acids, and to prevent the formation of acids or acidic salts during the treatment of the ore. In cyanidation it is usual to add an excess of lime to insure that sufficient is present throughout the treatment. At this point, there is an important distinction between the accepted process of cyanidation, and the process of the present invention.

In the process of the present invention the calcium hydroxide present in the solution must be regulated so that the concentration of this alkali does not inhibit the dissolving action. Preferably, the concentration of calcium hydroxide does not exceed 1/10 pound per ton of dissolving solution, although the treatment of some ores will tolerate a greater concentration. In treating some ores it has been found advisable to use no lime, but to maintain the necessary protective alkalinity with the use of other alkaline substances such as sodium carbonate, sodium hydroxide or ammonium hydroxide. In this respect it is not possible to state specific procedures that will cover all ores. As in all ore treatment some empirical experimenting is necessary to establish the most desirable working conditions, whereby the highest recovery is obtained, commensurate with the cost of operation.

Having regard to the foregoing paragraph on the role of calcium hydroxide and other alkalis used in connection with the proposed process, the use of the abovementioned polyamines (any one of them, or any combination of them) is simply the addition of these compounds to the usual cyanide solution. The point of introduction of the polyamines from the standpoint of economics and operational procedure must be established from experimental data, as must the quantity required to treat a given amount of ore in any specific case. The following tabulated examples show the amounts of all reagents used in those tests, along with certain data valuable to one seeking verification of the results.

Cyanide solutions of gold and silver are usually colourless, or very lightly coloured by dissolved base metal salts. Pregnant solutions resulting from the use of triethylene tetramine (or any one of the other noted aliphatic polyamines) with sodium cyanide are frequently highly coloured—usually pink, orange or red.

The treatment processes generally described as agitation, percolation, thickening, filtering, etc. may be carried out in the proposed process, in the same vessels or containers or pieces of equipment that are used for ordinary cyanidation.

After the gold and/or silver have dissolved in the triethylene tetramine and cyanide solution, it may be necessary to use some settling agent to speed separation of the liquid from the undissolved constituents of the ore. At this point (i. e. after the gold and/or silver have dissolved) lime may be added to the pulp as a settling aid without it causing the deposition of the gold and/or silver.

(c) *Precipitation process.*—Gold and/or silver may be recovered from the solutions resulting from the proposed treatment by the same means used to recover these metals from the solutions obtained by conventional cyanidation. No special equipment is required and the regular precipitants may be used.

Example 1

[A series of tests used to show the effectiveness of the proposed process in treating a silver ore not amenable to treatment by conventional cyanidation. L/S ratio refers to the ratio by weight of water to ore. Agitation was carried out at atmospheric pressure, with free access to air, at a room temperature of 60° F. As this ore sample was inherently alkaline, no lime or other alkali was required in those tests using triethylene tetramine. Very fine grinding was essential to liberate the silver minerals.]

| Sample | Grind |
|---|---|
| Silver ore containing little native silver and numerous refractory silver minerals. | 100% minus 325 mesh. | pH=8, (Ore and Water only, L/S 2/1).

| Ozs./ton | | Reagents, lbs./ton ore | | | L/S ratio | Hours agitation time | Solution colour | Percent extraction |
|---|---|---|---|---|---|---|---|---|
| Ag heads | Ag tailings | CaO | NaCN | T. E. T. | | | | |
| 52.00 | 36.80 | 2 | 4 | Nil | 2/1 | 24 | None | 29.2 |
| 52.00 | 20.54 | Nil | 4 | 1 | 2/1 | 24 | Red | 60.5 |
| 52.00 | 36.12 | 2 | 8 | Nil | 2/1 | 24 | None | 30.5 |
| 52.00 | 4.48 | Nil | 8 | 1 | 2/1 | 24 | Red | 91.4 |
| 52.00 | 4.26 | Nil | 8 | 2 | 2/1 | 24 | do | 91.8 |
| 52.00 | 35.80 | 2 | 12 | Nil | 2/1 | 24 | None | 31.1 |
| 52.00 | 3.70 | Nil | 12 | 1 | 2/1 | 24 | Red | 92.9 |
| 52.00 | 3.12 | Nil | 12 | 2 | 2/1 | 24 | do | 94.0 |

Abbreviation: T. E. T.—Triethylene tetramine.
Note: Solution refers to colour of solution after completion of agitation. The expression "free access to air" means allowing the solution to take up any or all of the gases of the atmosphere—notably oxygen.

Example 2

[A series of tests on lower grade silver ore containing very finely divided silver minerals in gangue of quartz, barite and calcite. This ore has a slightly acid reaction, and some lime is required in all extraction tests. Conditions of temperature, pressure, etc. same as before, with free access to the atmosphere during agitation.]

| Sample | Grind |
|---|---|
| Silver ore containing some silver minerals not amenable to cyanidation. | 92.7% minus 200 mesh. |

| Ozs./ton | | Reagents, lbs./ton ore | | | L/S ratio | Hours agitation time | Solution colour | Percent extraction |
|---|---|---|---|---|---|---|---|---|
| Ag heads | Ag tailings | CaO | NaCN | T. E. T. | | | | |
| 10.40 | 4.70 | 2 | 3 | Nil | 3/1 | 6 | None | 54.9 |
| 10.40 | 4.60 | 2 | 3 | Nil | 3/1 | 12 | do | 55.8 |
| 10.40 | 3.26 | 2 | 3 | 1 | 3/1 | 6 | Red | 68.8 |
| 10.40 | 1.54 | 2 | 3 | 1 | 3/1 | 12 | do | 85.2 |

| Sample | Grind |
|---|---|
| Same sample | 100% minus 325 mesh. |

| Ozs./ton | | Reagents, lbs./ton ore | | | L/S ratio | Hours agitation time | Solution colour | Percent extraction |
|---|---|---|---|---|---|---|---|---|
| Ag heads | Ag tailings | CaO | NaCN | T. E. T. | | | | |
| 10.40 | 2.86 | 2 | 3 | Nil | 3/1 | 24 | None | 72.5 |
| 10.40 | 0.76 | 1 | 3 | 1 | 3/1 | 24 | Red | 92.7 |

Example 3

[Showing the use and effect of triethylene tetramine in conjunction with sodium cyanide, compared with straight cyanidation, in treating an ore containing sulpharsenides and sulphantimonides of silver, at varying liquid-solid ratios. Conditions of temperature, pressure, etc. same as before, with free access to the atmosphere during agitation.]

| Sample | Grind |
|---|---|
| Sample as noted above | 100% minus 200 mesh. | pH=7.8, (Ore and Water, L/S 1/1).

| Ozs./ton | | Reagents, lbs./ton ore | | | L/S ratio | Hours agitation time | Solution colour | Percent extraction |
|---|---|---|---|---|---|---|---|---|
| Ag heads | Ag tailings | CaO | NaCN | T. E. T. | | | | |
| 22.30 | 12.20 | 2 | 6 | Nil | 3/1 | 24 | None | 45.3 |
| 22.30 | 3.58 | Nil | 6 | ½ | 3/1 | 24 | Red | 84.0 |
| 22.30 | 11.90 | 2 | 6 | Nil | 2/1 | 24 | None | 46.7 |
| 22.30 | 2.42 | Nil | 6 | ½ | 2/1 | 24 | Red | 89.1 |
| 22.30 | 11.86 | 2 | 6 | Nil | 1/1 | 24 | None | 46.9 |
| 22.30 | 2.20 | Nil | 6 | ½ | 1/1 | 24 | Red | 90.2 |

Example 4

[A series of tests showing the use of all three of the aliphatic polyamines in treating a silver ore not amenable to cyanidation. Physical conditions as before.]

| Sample | Grind |
|---|---|
| Mixture of silica and carbonates containing a majority of the silver as complex sulphosalts. | 97.1% minus 200 mesh. |

| Ozs./ton | | Reagents, lbs./ton ore | | | L/S ratio | Hours agitation time | Solution colour | Percent extraction |
|---|---|---|---|---|---|---|---|---|
| Ag heads | Ag tailings | CaO | NaCN | Polyamine | | | | |
| 46.00 | 32.80 | ½ | 8 | Nil | 2/1 | 24 | None | 28.7 |
| 46.00 | 28.50 | ½ | 8 | 2 T.E.T. | 2/1 | 24 | Pink | 38.1 |
| 46.00 | 34.70 | 2 | 8 | Nil | 2/1 | 24 | None | 24.6 |
| 46.00 | 33.42 | 2 | 8 | 2 T.E.T. | 2/1 | 24 | do | 27.4 |
| 46.00 | 8.00 | Nil | 8 | 1 T.E.T. | 2/1 | 24 | Red | 82.6 |
| 46.00 | 4.60 | Nil | 8 | 2 T.E.T. | 2/1 | 24 | do | 90.0 |
| 46.00 | 11.50 | Nil | 8 | 1 D.E.T. | 2/1 | 24 | Orange | 75.0 |
| 46.00 | 7.04 | Nil | 8 | 2 D.E.T. | 2/1 | 24 | do | 84.7 |
| 46.00 | 5.68 | Nil | 8 | 3 D.E.T. | 2/1 | 24 | do | 87.6 |
| 46.00 | 6.60 | Nil | 8 | 1 T.E.P. | 2/1 | 24 | Red | 85.7 |
| 46.00 | 6.20 | Nil | 8 | 2 T.E.P. | 2/1 | 24 | do | 86.6 |
| 46.00 | 6.20 | Nil | 8 | 3 T.E.P. | 2/1 | 24 | do | 86.6 |

Abbreviations: T. E. T.—Triethylene tetramine. D. E. T.—Diethylene triamine. T. E. P.—Tetraethylene pentamine.
Note: The first example is the best result that could be obtained by conventional cyanidation.

Example 5

[Tests on a pyritic gold ore (containing some galena) wherein conventional cyanidation is compared with the use of triethylene tetramine in conjunction with sodium cyanide. Conditions identical in all tests.]

| Sample | Grind |
|---|---|
| Coarse Pyrite in quartz with carbonates and some iron oxide. | 100% Minus 100 mesh. | pH—6.4.

| Ozs./ton | | Reagents, lbs./ton ore | | | L/S ratio | Hours agitation time | Solution colour | Percent extraction |
|---|---|---|---|---|---|---|---|---|
| Ag heads | Ag tailings | CaO | NaCN | T.E.T. | | | | |
| 2.97 | 0.44 | 2 | 4 | Nil | 2/1 | 12 | None | 85.2 |
| 2.97 | 0.28 | 1 | 4 | 1 | 2/1 | 12 | Pink | 90.6 |
| 2.97 | 0.40 | 2 | 4 | Nil | 2/1 | 18 | None | 86.6 |
| 2.97 | 0.24 | 1 | 4 | 1 | 2/1 | 18 | Pink | 91.9 |
| 2.97 | 0.36 | 2 | 4 | Nil | 2/1 | 24 | None | 87.8 |
| 2.97 | 0.20 | 1 | 4 | 1 | 2/1 | 24 | Red | 93.2 |

The examples shown above illustrate the treatment of a variety of ores. Similar results have been obtained in the treatment of concentrates produced from ores, and sinters produced from concentrates. In general, it may be stated that the use of the process of the present invention improves recovery of the precious metals by cyanidation whenever these metals are present in a form adaptable to treatment by cyanidation.

What I claim as my invention is:

1. In the cyanidation of precious metals, the improvement which consists in dissolving a metal selected from the group consisting of gold and silver in the presence of a small amount, of the order of a few pounds per ton of cyanide solution, of a polyamine selected from the group consisting of diethylene triamine, triethylene tetramine, and tetraethylene pentamine, while maintaining the concentration of calcium hydroxide below about 0.1 pound per ton of solution.

2. In the cyanidation of refractory precious metals, the improvement which consists in dissolving a metal selected from the group consisting of gold and silver in the presence of a small amount, of the order of a few pounds per ton of cyanide solution, of a polyamine selected from the group consisting of diethylene triamine, triethylene tetramine, and tetraethylene pentamine, while maintaining the concentration of calcium hydroxide below about 0.1 pound per ton of solution.

3. In the extraction of precious metals from pulps containing the same, the improvement which consists in subjecting the pulp in comminuted form to the action of a small amount of the order of a few pounds per ton of pulp of a polyamine selected from the group consisting of diethylene triamine, triethylene tetramine and tetraethylene pentamine and extracting a metal selected from the group consisting of gold and silver from said pulp by cyanidation, the concentration of calcium hydroxide in said pulp being maintained at a value below about 0.1 pound per ton.

4. In the cyanidation of refractory precious metals, the improvement which consists in dissolving a metal selected from the group consisting of gold and silver in the presence of a small amount, of the order of a few pounds per ton of cyanide solution, of triethylene tetramine while maintaining the concentration of calcium hydroxide below about 0.1 pound per ton of solution.

5. In the cyanidation of silver, the improvement which consists in dissolving the silver in the presence of a small amount, of the order of a few pounds per ton of cyanide solution, of a polyamine selected from the group consisting of diethylene triamine, triethylene tetramine, and tetraethylene pentamine, while maintaining the concentration of calcium hydroxide below about 0.1 pounds per ton of solution.

6. In the cyanidation of gold, the improvement which consists in dissolving the gold in the presence of a small amount, of the order of a few pounds per ton of cyanide solution, of a polyamine selected from the the group consisting of diethylene triamine, triethylene tetramine, and tetraethylene pentamine, while maintaining the concentration of calcium hydroxide below about 0.1 pound per ton of solution.

References Cited in the file of this patent

UNITED STATES PATENTS

| | | |
|---|---|---|
| 799,548 | Dupre | Sept. 12, 1905 |
| 1,136,872 | Hamilton | Apr. 20, 1915 |
| 2,220,212 | Clark | Nov. 5, 1940 |
| 2,234,140 | Falconer et al. | Mar. 4, 1941 |
| 2,267,205 | Kyrides | Dec. 23, 1941 |
| 2,389,878 | Senkus | Nov. 27, 1945 |
| 2,648,601 | Byler et al. | Aug. 11, 1953 |
| 2,729,557 | Booth et al. | Jan. 3, 1956 |

OTHER REFERENCES

Industrial and Engineering Chemistry, vol. 27, No. 8, August 1935, pages 867–871. Article by Wilson.